United States Patent [19]

Tank et al.

[11] Patent Number: 4,997,049
[45] Date of Patent: Mar. 5, 1991

[54] TOOL INSERT

[76] Inventors: Klaus Tank, 9 Warbleton Avenue, Essexwold, Johannesburg, Transvaal; Peter Tomlinson, 315 Endford Road, Mondeor, Johannesburg, Transvaal; Richard P. Burnand, 39 Constantia Avenue, Alan Manor Johannesburg, Transvaal, all of South Africa

[21] Appl. No.: 394,212

[22] Filed: Aug. 15, 1989

[30] Foreign Application Priority Data

Aug. 15, 1988 [ZA] South Africa ................... 88/6026
Nov. 14, 1988 [ZA] South Africa ................... 88/8500
Nov. 14, 1988 [ZA] South Africa ................... 88/8501

[51] Int. Cl.⁵ .................. E21B 10/46; B23P 15/28
[52] U.S. Cl. ................... 175/410; 175/411; 299/79; 407/118; 407/119
[58] Field of Search ........... 175/329, 374, 410, 411; 299/79; 51/293, 307; 76/101 E, DIG. 12; 407/119, 118; 125/39

[56] References Cited

U.S. PATENT DOCUMENTS

| 3,743,489 | 1/1973 | Wentorf, Jr. | |
| 3,745,623 | 7/1973 | Wentorf, Jr. et al. | |
| 4,148,368 | 4/1979 | Evans | 175/410 X |
| 4,373,593 | 2/1983 | Phaal et al. | 175/410 X |
| 4,457,765 | 7/1984 | Wilson | 175/410 X |
| 4,592,433 | 6/1986 | Dennis | 175/410 X |
| 4,702,649 | 10/1987 | Kommanduri | 175/410 X |

FOREIGN PATENT DOCUMENTS

| 2056381 | 5/1972 | Fed. Rep. of Germany | 175/410 |
| 1489130 | 10/1977 | United Kingdom . | |
| 2041427 | 9/1980 | United Kingdom | 175/410 |
| 2146058 | 4/1985 | United Kingdom . | |

Primary Examiner—Ramon S. Britts
Assistant Examiner—David J. Bagnell
Attorney, Agent, or Firm—Scully, Scott, Murphy & Presser

[57] ABSTRACT

A tool insert having a cemented carbide substrate with a recess formed in one end of the substrate and having an abrasive compact located in the recess and bonded to the substrate. The cemented carbide substrate has two ends joined by a side, and the recess formed in the substrate has a side and a base, with the side sloping inwards towards a center point of the base. The abrasive compact includes a top surface which provides a cutting surface or edge for the tool insert, a bottom surface which is complementary to the base of the recess, and a side surface which is complementary to the side of the recess.

12 Claims, 1 Drawing Sheet

TOOL INSERT

BACKGROUND OF THE INVENTION

This invention relates to tool inserts.

Tool inserts which consist of an abrasive compact bonded to a cemented carbide substrate are known in the art and are used extensively in tools such as mining picks, cutting tools and drill bits. The abrasive compact may be a diamond or cubic boron nitride abrasive compact. Such tool inserts have been extensively described in the patent literature, for example in British Patent No. 1,489,130 and U.S. Pat. Nos. 3,745,623 and 3,743,489.

British Patent No. 2,146,058 describes a cutting tool for a mining machine which comprises a holding lug, one end of which is adapted for mounting in a working surface of the machine, and the other end of which is provided with a socket, and a cutting insert located in the socket and secured to the lug. The cutting insert comprises an essentially hemispherical abrasive compact bonded to a cemented carbide substrate. The hemispherical shape abrasive compact provides a curved cutting edge for the cutting tool. In an alternative embodiment, the cutting insert comprises a cemented carbide substrate having a curved hemispherical end to which is bonded a thin skin of abrasive compact. Cutting inserts of the type described by this British patent, it has been found, give rise to stresses at the carbide/compact interface during brazing of the insert into the socket of the holding lug. South African Patent No. 84/0643 describes a tool insert which comprises a disc-shaped abrasive compact backed by cemented carbide and surrounded around at least 75% of its circumference by cemented carbide. The cutting edge is provided either by the cemented carbide or by an exposed edge of the abrasive compact.

SUMMARY OF THE INVENTION

According to the present invention, there is provided a tool insert comprising:
(a) a cemented carbide substrate having two ends joined by a side;
(b) a recess formed in one end of the substrate and having a side and a base, the side sloping inwards towards a center point of the base;
(c) an abrasive compact located in the recess and bonded to the substrate, the abrasive compact having a top surface which provides a cutting surface or edge for the tool insert, a bottom surface complementary to the base of the recess, and a side surface at least partially located in the recess, the portion of the side surface located in the recess being complementary to the side of the recess.

DETAILED DESCRIPTION OF THE PREFERRED EMBODIMENTS

It is important in the practice of the invention that the side of the recess slopes inward towards a center point of the base. The invention may take various forms to achieve this. In one form, the base is planar and the side is also planar and meets the base at its periphery. In another form of the invention the base is planar and the side is curved. In yet another form of the invention the side and base form a continuous curve.

The top surface of the abrasive compact may be planar in which event an edge of the surface will generally provide the cutting edge for the tool insert. The surface may also be curved in which event this curved surface will generally provide the cutting surface for the insert.

The abrasive compact may be any known in the art but will generally be a diamond or cubic boron nitride abrasive compact. Such compacts and their method of manufacture are described, for example, in the above-mentioned patents.

The cemented carbide of the substrate may be any known in the art such as cemented tungsten carbide, titanium carbide, tantalum carbide or a mixture thereof.

The tool inserts have particular application to mining picks and to rotary drill bits. The inserts will be located in the working surface of a tool such that the cemented carbide substrate is located in that surface and the cutting surface or edge of the compact is exposed to perform its cutting action.

Various embodiments of the invention will now be described with reference to the accompanying drawings.

Figure 1:
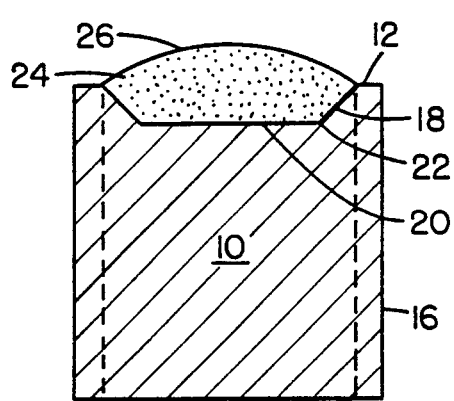
FIGS. 1 to 6 illustrate sectional side views of various embodiments of tool inserts of the invention.

Referring first to FIG. 1, there is shown a tool insert comprising a right circular cylindrical cemented carbide substrate 10 having top surface 12, bottom surface 14 and side surfaces 16. A recess is formed in the top surface 12 of the substrate. The recess is defined by inwardly sloping side 18 which meets a flat or planar base 20 at its periphery 22. The recess is thus essentially dish-shaped. The surfaces 18, 20 can, in an alternative embodiment, form a continuous curve.

Located in the recess is an abrasive compact 24 which is bonded to the substrate. The abrasive compact has an outwardly curved hemispherical top surface 26 which extends above the top, planar surface 12 of the substrate 10. In use, the tool insert will be so mounted in the working surface of a tool that the curved surface 26 of the abrasive compact provides the cutting surface for the tool.

The carbide substrate 10, in an alternative embodiment, can be cut-away along the dotted lines.

Figure 2:
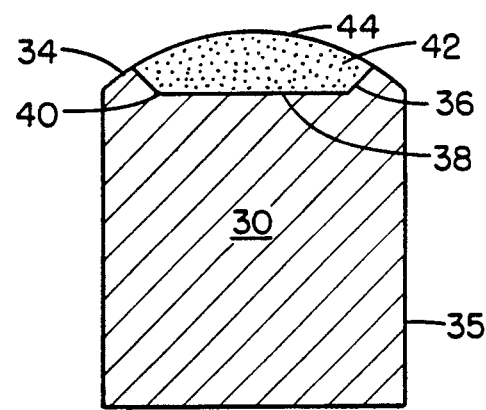

A second embodiment of the invention is illustrated by FIG. 2. Referring to this figure, there is shown a tool insert comprising a right circular cylindrical cemented carbide substrate 30 having a flat bottom surface 32 and a curved top surface 34 and side surface 35. The curved top surface 34 has a recess formed therein. The recess is defined by the inwardly sloping side 36 which meets a flat or planar bottom surface 38 at its periphery 40. This gives the recess a dish-shape. As with the previous embodiment, the recess may also be defined by a continuously curved surface.

Located in the recess is an abrasive compact 42. The abrasive compact 42 is bonded to the substrate 30. The abrasive compact 42 has an outwardly curved hemispherical top surface 44 which forms an extension of the curved upper surface 34 of the substrate. In use, the tool insert will be so mounted in the working surface of a tool that the curved upper surface 44 of the abrasive compact provides the cutting surface of the tool.

The embodiment of FIGS. 1 and 2 can, as an alternative, be used in a similar manner to that of the FIG. 3 embodiment described hereinafter.

Figure 3:
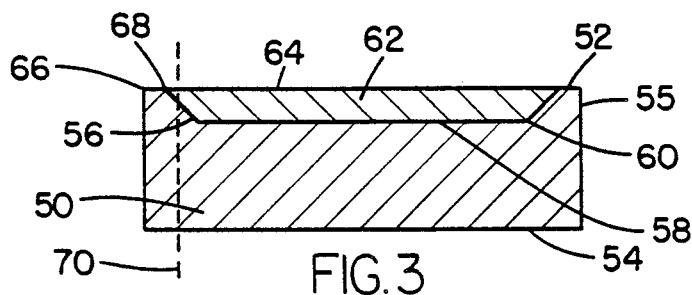

A third embodiment of the invention is illustrated by FIG. 3. Referring to this figure, there is shown a tool insert comprising a disc-shaped cemented carbide substrate 50 having flat surfaces 52, 54 on each of opposite sides thereof and a side surface 55. A recess is formed in the flat surface 52. The recess has inwardly sloping side 56 which meets a flat base 58 at its periphery 60. Located in the recess and bonded to the cemented carbide substrate, is an abrasive compact 62. The abrasive compact has a flat top surface 64.

In use, the tool insert is mounted in a tool such that the edge 66 of the cemented carbide substrate is the cutting edge. This cemented carbide cutting edge wears away until the edge 68 of the abrasive compact is reached, that edge 68 being in the same plane as the edge 66. The cutting edge is now provided by the abrasive compact which also wears with time to a plane illustrated, for example, by dotted line 70. Wear of the cutting edge, and in particular wear of the cutting edge 68 of the abrasive compact, takes place in a controlled manner.

Figure 4:
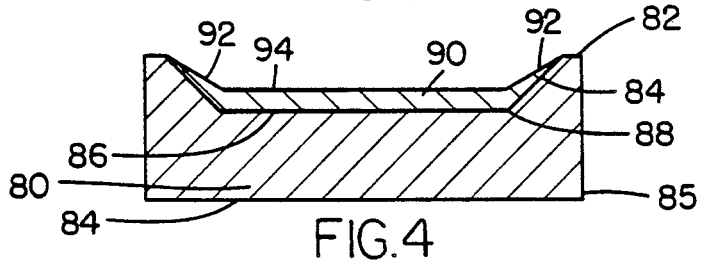

A fourth embodiment of the invention is illustrated by FIG. 4. Referring to this figure, there is shown a tool insert comprising a disc-shaped cemented carbide substrate 80 having flat surfaces 82, 84 on each of opposite sides thereof and side surface 85. A recess is formed in the flat surface 82. The recess has an inwardly sloping side 84 meeting a flat base 86 at its periphery 88. Located in this recess and bonded to the cemented carbide substrate is an abrasive compact 90. The abrasive compact 90 has a recessed top surface defined by sloping internal side surfaces 92 and a base surface 94.

The tool insert of FIG. 4 is used and wears in the same manner as described above for the tool insert of FIG. 3.

Figure 5:
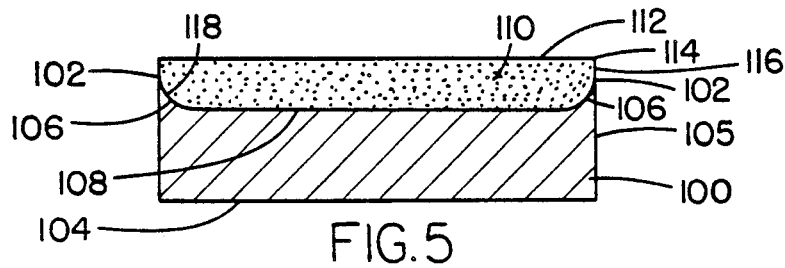

FIG. 5 illustrates a further embodiment of the invention. Referring to this figure, there is shown a cemented carbide substrate 100 having a top end 102, a bottom flat end 104 and side surface 105. The top end 102 has a recess formed therein. This recess has curved sides 106 which meet a flat or planar base 108.

Located in the recess is an abrasive compact 110. The abrasive compact has a flat top surface 112, the periphery 114 of which provides the cutting edge for the insert. The compact has a side surface defined by a first flat portion 116 meeting a curved portion 118 which is complementary to the curved side 106 of the recess. The base of the compact is flat.

Figure 6:
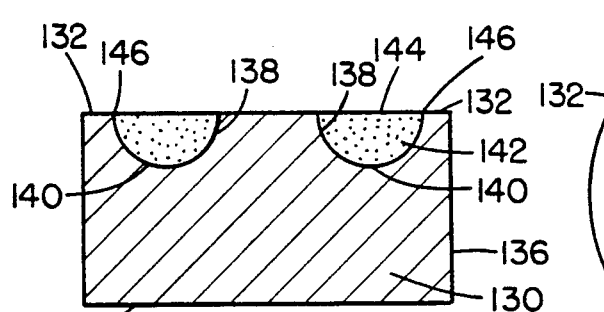
Figure 7:
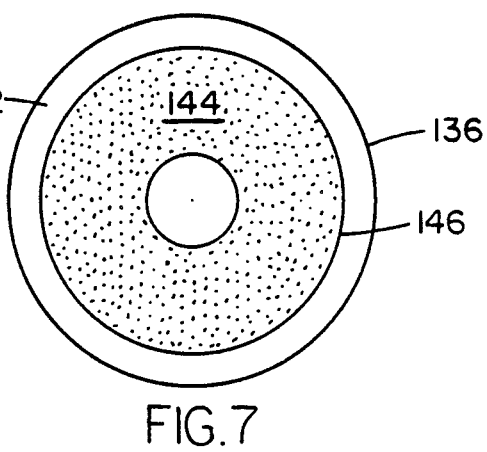
FIG. 7 is a plan view of the embodiment of FIG. 6.

Another embodiment of the tool insert is illustrated by FIGS. 6 and 7. Referring to these Figures, a right circular cylindrical cemented carbide substrate 130 has a top surface 132, a bottom surface 134 and a side surface 136.

An annular recess is formed in the top surface 132. This annular recess has sides 138 sloping inwards to a curved base 140. The sides and base of the recess form a continuous curve.

An abrasive compact 142 is located in the recess. This abrasive compact has a top surface 144 and a curved lower surface complementary to the continuous curve defined by the sides and base of the recess. The abrasive compact is bonded to the substrate.

The outer edge 146 of the top compact surface 144 provides the cutting edge for the insert. The insert will be used in the same manner as that described for the FIG. 3 embodiment.

Considerable heat is generated when the various embodiments of the tool insert of the invention are used in a cutting or like abrading action. Further, in some applications such as mining picks, the tool insert is subjected to cyclical dynamic forces. These effects produce stresses at the compact/cemented carbide interface and can lead to spalling of the compact top surface. It has been found that the tool inserts of the invention, with its dish-shaped recess in the substrate and complementary shaped abrasive compact allows for controlled wear of the cutting edges, reduces the risk of spalling and results in better heat dissipation and distribution of the forces which act on the insert during use. This is particularly so when the insert is used in a mining pick application.

We claim:

1. A tool insert comprising:
   (a) a cemented carbide substrate having two ends joined by a side;
   (b) a recess formed in one end of the substrate and having a side and a base, the side sloping inwards towards a center point of the base;
   (c) an abrasive compact located in the recess and bonded to the substrate, the abrasive compact having a top surface which provides a cutting surface or edge for the tool insert, a bottom surface complementary to the base of the recess, and a side surface at least partially located in the recess, the portion of the side surface located in the recess being complementary to the side of the recess.

2. A tool insert according to claim 1 wherein the base of the recess is planar.

3. A tool insert according to claim 1 wherein the side of the recess is planar.

4. A tool insert according to claim 1 wherein the side of the recess is curved.

5. A tool insert according to claim 1 wherein the top surface of the compact is planar and an edge of this surface provides a cutting edge for the insert.

6. A tool insert according to claim 1 wherein the top surface of the compact is curved and this curved surface provides a cutting surface for the insert.

7. A tool insert according to claim 6 wherein the end of the substrate in which the recess is formed has a portion surrounding the recess, this portion sloping away from the curved top surface of the compact.

8. A tool insert according to claim 1 wherein the end of the substrate in which the recess is formed has a planar portion surrounding the recess.

9. A tool insert according to claim 8 wherein the cutting surface or edge of the compact is in the same plane as that of the substrate planar portion.

10. A tool insert according to claim 1 wherein the recess is an annular recess.

11. A tool insert comprising:
    (a) a cemented carbide substrate having two ends joined by a side;
    (b) a recess formed in one end of the substrate and having a planar side and a planar base, the side sloping inwards towards a center point of the base;
    (c) an abrasive compact located in the recess and bonded to the substrate, the abrasive compact having a top surface which provides a cutting surface or edge for the tool insert, a bottom planar surface complementary to the base of the recess, and a side planar surface complementary to the side of the recess;
    (d) the end of the substrate in which the recess is formed having a planar portion surrounding the recess.

12. A tool insert according to claim 11 wherein the top surface of the abrasive compact is curved.

* * * * *